Patented Sept. 13, 1938

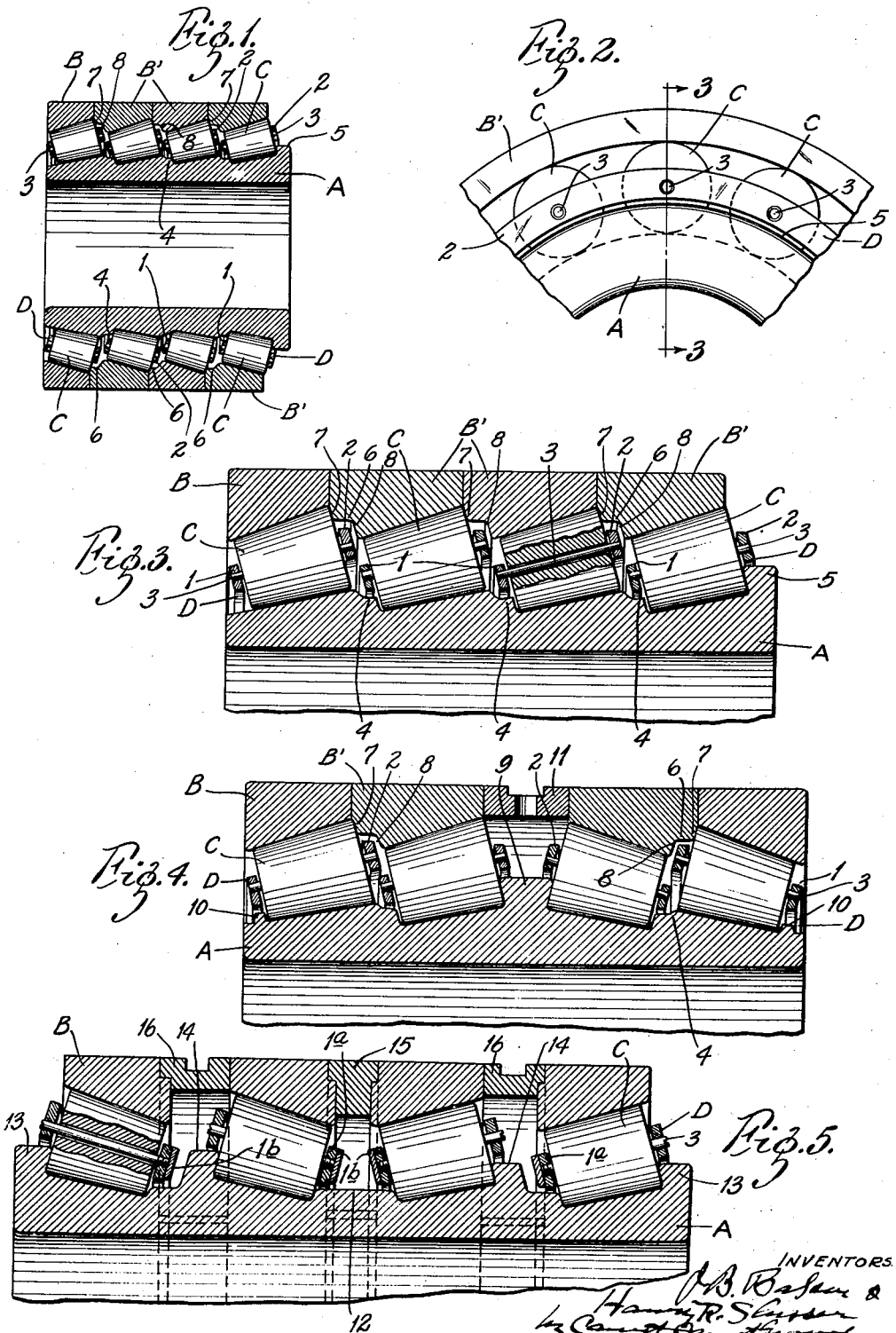

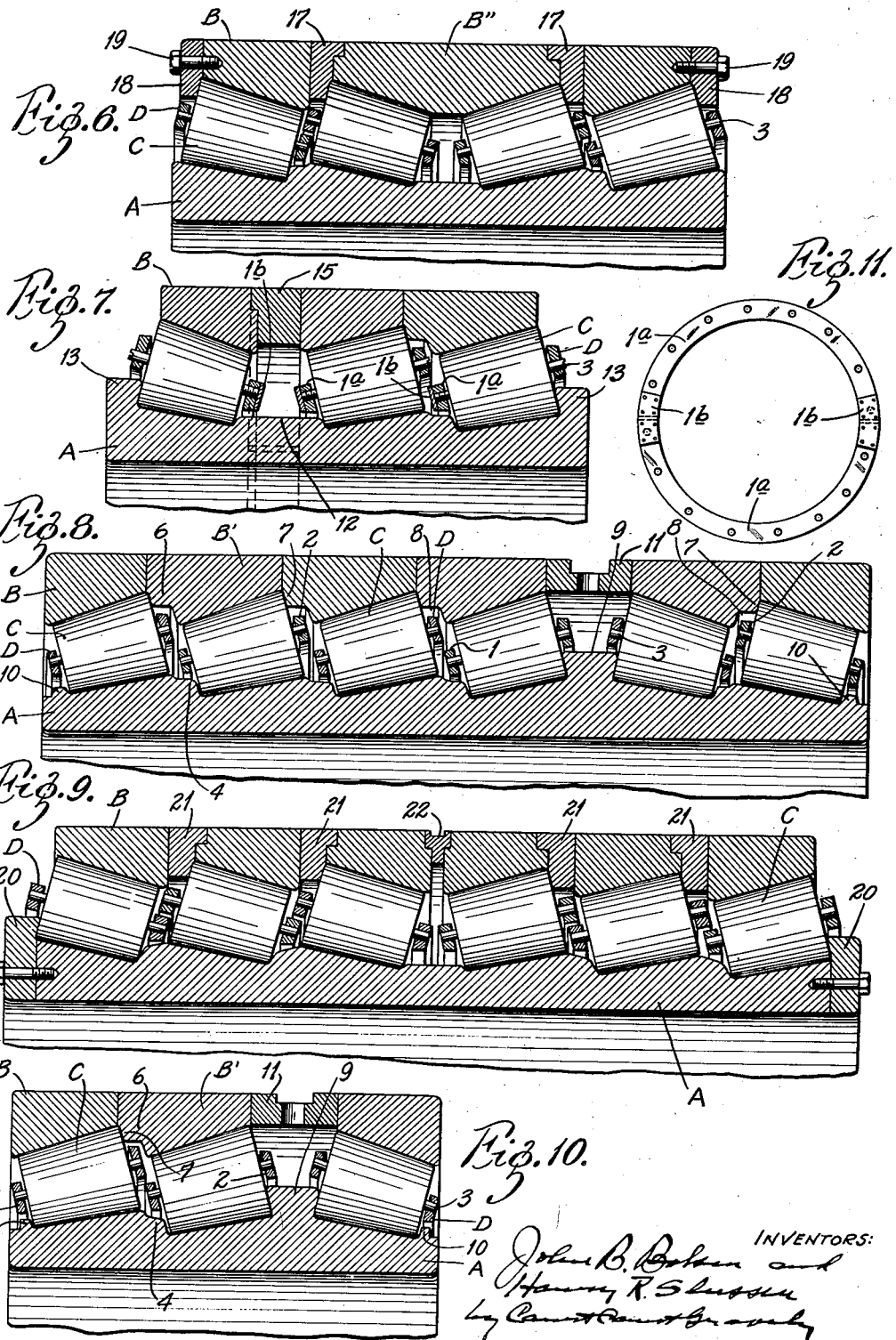

2,130,258

UNITED STATES PATENT OFFICE 2,130,258

MULTIPLE-ROW TAPER ROLLER BEARING

John B. Baker and Harry R. Slusser, Canton, Ohio, assignors to The Timken Roller Bearing Company, Canton, Ohio, a corporation of Ohio Application May 25, 1936, Serial No. 81,630

22 Claims. (Cl. 308—214)

Our invention relates to roller bearings, particularly taper roller bearings of the type wherein there are two or more series or rows of taper rollers arranged alongside of each other. The principal objects of the present invention are to minimize the length of such multi-row bearing and simplify and facilitate the construction and assembly thereof. The invention consists principally in a multi-row taper roller bearing wherein the end of the cage of one series or row of rolls lies in or close to the same plane perpendicular to the axis of the bearing as the adjacent end of the cage of the next series of rolls. It also consists in making separate outer raceway members for the respective rows of rollers and designing the portion of each such raceway member beyond the small end of its raceway to accommodate the large end of the cage of the next adjacent row of rollers. It also consists in designing the large end face of the cup of one row to serve as a rib to take the end thrust of the rollers of the next adjacent row. It also consists in making the portion of the inner raceway member next to the large end of the raceway of small enough diameter to permit a series of cage rings to be passed over such portion and into proper position to complete the assembly of the cage and roller units of the bearing. It also consists in designing the portion of one cup beyond the small end of its raceway so as to accommodate the large end of the cage of the next row. It also consists in the parts and arrangements and combinations and arrangements of parts hereinatfer described and claimed.

In the accompanying drawings, which form part of this specification and wherein like reference numerals refer to like parts wherever they occur, Fig. 1 is a longitudinal sectional view of a multiple-row bearing conforming to my invention;

Fig. 2 is an enlarged end view of a portion of the bearing illustrated in Fig. 1;

Fig. 3 is a longitudinal section on the line 3—3 of the portion of the bearing shown in Fig. 2;

Figs. 4, 5, 6, 7, 8, 9 and 10 are longitudinal sectional views illustrating divers modifications; and Fig. 11 is a detail view of one of the end rings of the cages shown in Figs. 5 and 7.

The ordinary taper roller bearing comprises an inner raceway member A, an outer raceway member B, a series of taper rollers C interposed between the inner and outer raceways, and a cage D for spacing said rollers apart; and a multi-row bearing is a more or less intimate assembly of a plurality of such unit bearings. The cage illustrated is of the type comprising end ring members 1 and 2, respectively, connected by pins 3 that extend through axial bores provided therefor in the respective rollers C with their ends threaded in or welded or riveted to said end rings.

In the multi-row bearing illustrated in Figs. 1, 2 and 3, the inner bearing member A has a plurality of similarly disposed conical raceways formed on a single piece and with the large diameter end of one raceway spaced a short distance endwise from the small diameter end of the next adjacent raceway. The portion 4 of the inner bearing member between the two planes, which are perpendicular to the axis of the bearing and pass through the adjacent ends of adjacent raceways, is of such length longitudinally of said axis and of such diameter as to accommodate the small end ring 1 of the roller cage D which is adjacent thereto; that is, the outside diameter of such portion 4 is less than the inside diameter of the small cage ring, and such portion is long enough to receive the small end of the roller cage of one row of rollers without crowding it against the large ends of the rollers of the next row. The inner bearing member A is provided with an annular rib 5 near one end thereof, that is, at the large diameter end of the adjacent raceway, which is hereinafter called the first, said rib being preferably integral with said member and adapted to take the thrust of the large ends of the rollers C of the first row. For convenience, this ribbed portion is hereinafter referred to as the large end, while the opposite end is called the small end of the inner raceway member.

The cup or outer raceway member B for the last row of rollers is of ordinary type with its inner surface formed into a simple conical raceway. Each of the other cups or outer raceway members B' is designed specially for cooperation with the bearing row next to it inwardly endwise. For this purpose, the thick end of such cup B' is extended, as shown at 6, beyond the small diameter end of its raceway surface so as to abut against the thin end of the cup next adjacent thereto inwardly, that is, at the large diameter end of the raceway. The portion of the end of the cup radially inwardly of the large end of the raceway surface of such adjacent cup constitutes an annular thrust rib 7 for the large ends of the rollers of the next adjacent cup. The portion 8 of the small end of the raceway of the cup or outer bearing member between said thrust rib and the raceway thereof is of large enough diameter and of sufficient length to accommodate the large end ring 2 of the cage of the next adjacent row of rollers.

The operation of assembling the multi-row bearing hereinbefore described is as follows: The first unit at the right or large end of the inner raceway member is assembled thereon by passing the large end ring 2 over either end of said member and the small end ring 1 over the small end thereof, placing the rollers between said rings and on the first or innermost raceway with their large ends against the thrust rib 5 of said inner bearing member, and then passing the cage pins 3 through said cage rings and said rollers from either end of the cage. When the first series of rollers is thus positioned, the first or innermost cup is slipped over the small end of the inner bearing member into proper position surrounding said first series of rollers. The second unit is assembled around the second raceway by passing the end rings over the small diameter end of the inner raceway member, placing the rollers between said rings with their large ends against the thrust rib 7 of the first cup, passing the cage pins through said cage rings and rollers from the small end of the cage, and then passing the second cup over the small end of said inner raceway into proper position surrounding the second series of rollers. The third unit is assembled in the same manner as the second unit; and the cage and rollers of the fourth or last unit are preferably mounted on the fourth or last raceway of the inner raceway member as a complete preassembled unit, after which the fourth or last cup is mounted on said rollers, thus completing the assembly of the multi-row bearing. In some cases, it might be necessary to refinish the back end of the last cup or to interpose accurately-ground spacer rings between adjacent cups in order to obtain the desired bearing length or adjustment.

It is noted that, in the completed assembly, the large end of the second cage overlaps without touching the small end of the first cage. Likewise, the large end of the third cage overlaps the small end of the second cage, and so on. In this way, the assembly as a whole is much shorter than previous multi-row bearings.

In the construction hereinbefore described, all of the inner raceways taper in the same direction. In the constructions illustrated in Figs. 4, 8 and 10, each of the inner bearing members is provided intermediate between its ends with an annular rib 9 and with one or more conical raceways on opposite sides thereof, all of the raceways tapering away from said rib. In these constructions, the rib 9 that separates the two adjacent oppositely tapered raceways has its side faces formed into undercut thrust shoulders for the large ends of the rollers next adjacent to said rib. The thrust shoulders for the rollers of all but the two innermost rows are formed on the ends of the cups of the next adjacent rows, as described in reference to the construction of Fig. 3. At each end of the inner bearing member is an annular rib 10 of a diameter that is small enough to permit assembly of small cage rings and still is large enough to hold the endmost cage and roller assemblies in place on the inner raceway member when the endmost cups are removed. In these constructions, a suitable spacing ring 11 is used between the two adjacent oppositely tapered cups.

In assembling the bearings shown in Figs. 4, 8 and 10, the cage rings for the two series of rollers that cooperate with the thrust rib 9 of the inner bearing member are passed over the small ends of said member and the two series of rollers secured in position between the end rings of their respective cages by means of the cage pins. The cup spacer ring 11 is then placed in position and the cups for the two series of rollers are mounted thereon in abutting relation to said spacing ring. The remaining bearing units are then assembled on the inner raceway member in the same manner as the corresponding units of the bearing shown in Fig. 3, except the last unit which must be assembled on the cone and not as a unit, as in Fig. 3.

In the constructions illustrated in Figs. 5 and 7, two adjacent raceways taper towards each other and the two end raceways taper towards each other. In each of these designs, the inner bearing member has an annular rib 12 between the two adjacent raceways that taper toward each other, and the two cup raceways corresponding with said inner raceways taper toward each other. At each end of the inner bearing member of each design is an annular rib 13 that serves to take the thrust reaction of the large ends of the rollers of the endmost rows; and in the design of Fig. 5 there are similar thrust ribs 14 on the inner bearing member alongside the large ends of the two innermost raceways. In each of these constructions, there are spacing rings 15 made of half sections between the two adjacent cups that taper toward each other; and in Fig. 5 there are similar rings 16 between said cups and the endmost cups.

In the constructions shown in Figs. 5 and 7, the inside diameter of the small cage rings is less than the outside diameter of the thrust ribs 13 and 14 of the inner bearing member. Therefore, to permit assembly of the small cage rings on the inner bearing member, said rings are made of half rings or sections 1a that are placed on opposite sides of the inner bearing member and secured together at their meeting edges by arcuate plates 1b, as shown in Fig. 11.

The operation of assembling the multi-row bearing of Fig. 5 is as follows: The small built-up rings for the two innermost roller cages are assembled around the rib 12 of the inner raceway member in the manner just described, the large ring of one cage is passed over the inner raceway member, and a set of rollers secured in position between said large ring and the built-up small ring for said cage by means of the cage pins. The cup for this set of rollers is then placed in position thereon; after which the cup for the other innermost set of rollers passed over the inner raceway member with its thick end in abutting relation to the thick end of the first mentioned cup. The large ring of the other innermost cage is then passed over the inner bearing member, and the other innermost set of rollers is secured in position between said ring and the built-up small ring for said other cage by means of the cage pins. The split spacer ring 15 is then placed in position between the two innermost cups. This operation is repeated for each successive series of cage rings, rollers and cups. In the bearing shown in Fig. 7, the right hand cage, roller and cup are assembled in place on the inner raceway member; and the two adjacent reversely tapered cage, roller and cup units, together with cup spacing ring 15, are assembled in the same manner as the corresponding parts of the bearing shown in Fig. 5.

The construction illustrated in Fig. 6 has four raceways on the inner bearing member arranged in two groups, the raceway of each group tapering toward those of the other group. In this construction, the outer raceways for the two innermost series of rollers are formed on a single cup member B" and the thrust ribs for said innermost series of rollers are on separate rings 17 interposed between the ends of this double cup and the single cups for the endmost series of rollers and piloted on the ends of said double cup. The thrust ribs of the endmost cups are preferably separate rings 18 detachably secured thereto, as by cap screws 19.

In assembling the bearing shown in Fig. 6, one of the two innermost cage and roller units is assembled on its raceway, the double cup B" is placed in position and the other innermost cage and roller unit is then assembled between its raceways, the thrust rings 17 are then placed opposite the ends of said double cup and the end cups set in place, after which the end cage and roller units are assembled on their raceways, and the detachable cup ribs 18 secured to the thin ends of the end cups.

In the construction illustrated in Fig. 9, there are six raceways arranged in two groups of three rows each. In this construction, the thrust of the rollers of the endmost rows is taken by shoulders formed on separate rings 20 detachably secured to the ends of the inner bearing member, the thrust of the rollers of the other rows being taken by thrust rings 21 interposed between adjacent cups at the large ends of said rollers. In this construction, the raceways for the two innermost rows of rollers are formed on separate cups with a spacing ring 22 located therebetween. This bearing is assembled in substantially the same manner as the bearing shown in Fig. 6.

In the constructions illustrated in Figs. 4 to 6, and 9, the number of raceways tapering in one direction is equal to the number of raceways tapering in the opposite direction. This arrangement is suitable when it is desirable to balance the endwise thrusts in opposite directions. Obviously, however, the number of raceways tapering in one direction need not be equal to the number of raceways tapering in the opposite direction and Figs. 7, 8 and 10 illustrate groups of unequal members. In fact, one series of raceways may be reduced to a single bearing as shown in Figs. 7 and 10, or entirely omitted as shown in Fig. 3.

What we claim is:

1. A roller bearing including an inner bearing member having a series of similarly disposed conical raceways, a series of conical rollers for each of said raceways, a cage for each of said series of rollers, and a continuous annular outer raceway member for each of said series of rollers, the outside diameter of the small end of one of said cages being smaller than the inside diameter of the large end of the next adjacent cage and said ends lying close to the same plane perpendicular to the axis of the bearing.

2. A roller bearing including an integral inner bearing member having a series of similarly disposed conical raceways of substantially equal mean diameter, a series of conical rollers for each of said raceways, a cage for each of said series of rollers, and an outer raceway member for each of said series of rollers, the small end of one of said cages and the large end of the next adjacent cage overlapping in a plane perpendicular to the axis of the bearing.

3. A roller bearing including an inner bearing member having a series of longitudinally spaced conical raceways, a series of conical rollers for each of said raceways, a tapered cage for each series of rollers, and outer raceway members for said series of rollers, the large end of the conical raceways of said inner bearing member being of small enough diameter to permit the small ends of a tapered cage to be passed over said raceways.

4. A roller bearing including an integral inner bearing member having an annular rib thereon interposed between the ends thereof, a series of conical raceways on one side of said rib tapering in one direction and a series of conical raceways on the other side of said rib and tapering in the opposite direction, a series of conical rollers for each of said raceways, a tapered cage for each series of rollers, and an outer raceway member for each series of rollers, the small end of one cage and the large end of the next adjacent cage overlapping in a plane perpendicular to the axis of the bearing.

5. A roller bearing including an integral inner bearing member having an annular rib thereon interposed between the ends thereof, a series of conical raceways on one side of said rib tapering in one direction and a series of conical raceways on the other side of said rib and tapering in the opposite direction, a series of conical rollers for each of said raceways, a tapered cage for each series of rollers, and an outer raceway member for each series of rollers, the small end of one cage and the large end of the next adjacent cage overlapping in a plane perpendicular to the axis of the bearing, the portions of said inner bearing member between its ends and the rib intermediate therebetween being of small enough diameter to permit the small ends of the cages to pass endwise over the raceways thereon.

6. A roller bearing including an integral inner bearing member having an annular rib adapted to constitute a thrust bearing for the ends of rollers, series of conical raceways on opposite sides of said thrust rib and tapering therefrom, a series of conical rollers for each of said raceways, a cage for each series of rollers, and outer raceway members for said series of rollers, the small end of one cage and the large end of the next adjacent cage lying close to the same plane perpendicular to the axis of the bearing, the outer raceway member for one series of rollers constituting an abutment for the large ends of the rollers of an adjacent series.

7. A roller bearing including an integral inner bearing member having an annular rib, series of conical raceways on opposite sides of said rib and tapering towards said rib, a series of conical rollers for each of said raceways, a cage for each series of rollers, and outer raceway members for said series of rollers, the small end of one cage and the large end of the next adjacent cage lying close to the same plane perpendicular to the axis of the bearing, said rib and the portions of said inner bearing member between raceways being of small enough diameter to accommodate the small ends of the respective cages.

8. A roller bearing including an inner bearing member having a series of similarly disposed conical raceways, a series of conical rollers for each of said raceways, a cage for each of said series of rollers, and outer raceway members for said series of rollers, the small end of one cage and the large end of the next adjacent cage overlapping in a plane perpendicular to the axis of the bearing, the portion of said inner bearing members between successive raceways being long enough axially and small enough in diameter to accommodate the small end of the adjacent cage.

9. A roller bearing including a plurality of sets of taper rollers tapering in the same direction, cages therefor and inner and outer raceway members therefor, one or more of the outer raceway members having an integral extension beyond the small end of its raceway, said extension abutting against the next adjacent outer raceway member and having its end face formed into an undercut thrust shoulder for the large ends of the rollers on the next adjacent raceway, said extension being long enough and of large enough inside diameter to accommodate inside said extension the large end of the cage of the rollers on said next adjacent raceway.

10. A roller bearing including an integral inner bearing member having a series of similarly disposed conical raceways of substantially equal mean diameter, a series of conical rollers for each of said raceways, a cage for each series of rollers, and outer raceway members for said series of rollers, the small end of one cage and the large end of the next adjacent cage overlapping in a plane perpendicular to the axis of the bearing, the portion of said inner bearing member between successive raceways being long enough axially and small enough in diameter to accommodate the small end of the adjacent cage and the outer bearing members having extensions beyond the small diameter ends of their raceways of sufficient length and of large enough inside diameter to accommodate the large ends of the next adjacent cage.

11. A roller bearing including an inner bearing member having a series of similarly disposed conical raceways, a series of rollers for each of said raceways, a cage for each series of conical rollers, and outer raceway members for said series of rollers, the portions of the outer raceway members beyond the small diameter ends of the raceway surfaces thereof being of larger inside diameter than the outside diameter of the large end of the cage of the rollers on the next adjacent raceway.

12. A roller bearing including an integral inner bearing member having a series of similarly disposed conical raceways of substantially equal mean diameter, a series of conical rollers for each of said raceways, a cage for each series of rollers, and outer raceway members for said series of rollers, the small end of one cage and the large end of the next adjacent cage overlapping in a plane perpendicular to the axis of the bearing, the portions of the outer raceway members beyond the small diameter ends of the raceway surfaces thereof being of larger inside diameter than the outside diameter of the large end of the cage of the rollers on the next adjacent raceway.

13. A roller bearing including an integral inner bearing member having a series of similarly disposed conical raceways of substantially equal mean diameter, a series of conical rollers for each of said raceways, a cage for each series of rollers, and outer raceway members for said series of rollers, the small end of one cage and the large end of the next adjacent cage overlapping in a plane perpendicular to the axis of the bearing, the portion of said inner bearing members between successive raceways being long enough axially and small enough in diameter to accommodate the small end of the adjacent cage.

14. A multi-row taper roller bearing including a plurality of sets of conically disposed taper rollers facing in the same direction, conical cages for the respective sets of rollers having large and small annular ends, the outside diameter of the small end being smaller than the inside diameter of the large end and inner and outer bearing members having conical raceway portions for the respective sets of rollers, said bearing members having the portions between adjacent sets of rollers shaped to accommodate the ends of adjacent cages and thereby permit close spacing of said sets of rollers.

15. A multi-row taper roller bearing including a plurality of sets of conically disposed taper rollers facing in the same direction, at least one set of conically disposed taper rollers facing in the opposite direction at one end of the group composed of said first mentioned sets of rollers, and inner and outer raceway members for said rollers, said inner raceway member being integral and having thrust ribs for the rollers of the respective sets.

16. A multi-row taper roller bearing including an even number of sets of conically disposed taper rollers facing in the same direction, an even number of sets of conically disposed taper rollers facing in the opposite direction at one end of the group composed of said first mentioned sets of rollers, and inner and outer raceway members for said rollers, said inner raceway member being integral and having thrust ribs for the rollers of the respective sets.

17. A multi-row taper roller bearing including a plurality of sets of conically disposed taper rollers facing in the same direction, at least one set of conically disposed taper rollers facing in the opposite direction at one end of the group composed of said first mentioned sets of rollers, a single integral inner bearing member having raceways and thrust ribs for the respective sets of rollers, and outer bearing members for said sets of rollers.

18. A roller bearing including an inner raceway member having series of inner conical raceway members, a series of outer raceway members, taper rollers between said members, members forming thrust ribs alongside the large diameter end of the raceways of said outer raceway members, said inner raceway member having a removable thrust rib opposite the large end of its endmost raceway.

19. A roller bearing including an inner bearing member having a series of similarly disposed conical raceways, a series of conical rollers for each of said raceways, a cage for each of said series of rollers, and a continuous annular outer raceway member for each of said series of rollers, said outer raceways being alined in non-overlapping relation, the outside diameter of the small end of one of said cages being smaller than the inside diameter of the large end of the next adjacent cage.

20. A roller bearing including an inner bearing member having a series of similarly disposed conical raceways, a series of conical rollers for each of said raceways, a cage for each of said series of rollers, and a continuous annular outer raceway member for each of said series of rollers, said bearing having thrust ribs for the respective series of rollers, the large ends of all the rollers of each series bearing against the thrust rib provided for that series, the outside diameter of the small end of one of said cages being smaller than the inside diameter of the large end of the next adjacent cage.

21. A roller bearing including an inner bearing member having a series of similarly disposed conical raceways, a series of axially perforated conical rollers for each of said raceways, a cage for each of said series of rollers comprising end rings detachably secured together by pins that extend through the bores of said rollers, and a continuous annular outer raceway member for each series of rollers, said bearing having thrust ribs for the large ends of all the rollers.

22. A roller bearing including an integral inner bearing member having a series of similarly disposed conical raceways of substantially equal mean diameter, a series of conical rollers for each of said raceways, a cage for each of said series of rollers, and a continuous annular outer raceway member for each of said series of rollers, one of said raceway members having a thrust rib at its large end against which the rollers on the raceway member next adjacent longitudinally bear endwise.

JOHN B. BAKER.
HARRY R. SLUSSER.